Figure 5:
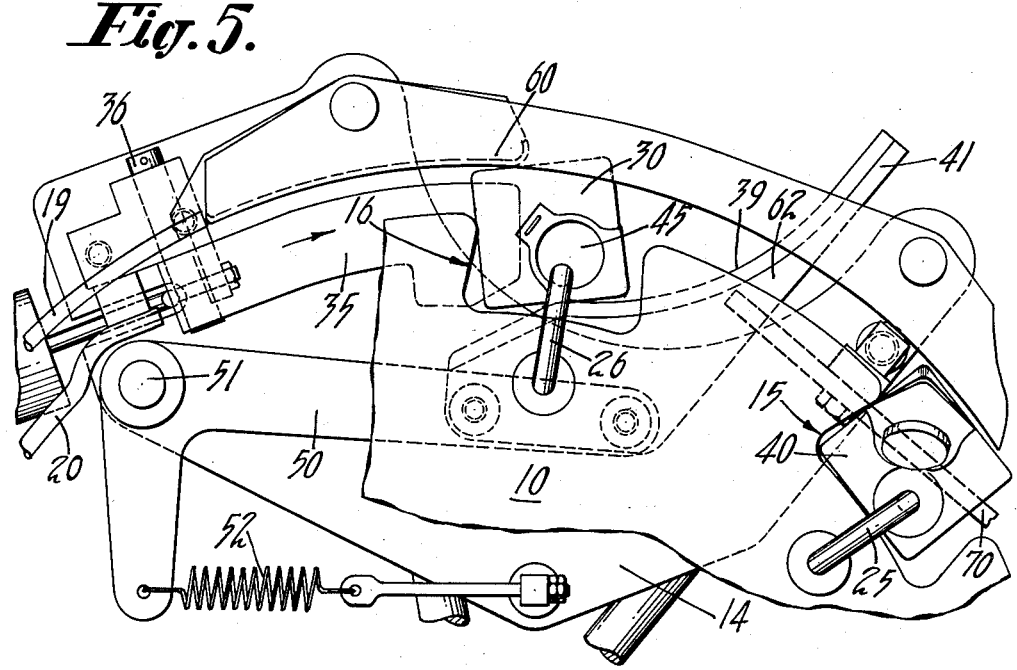

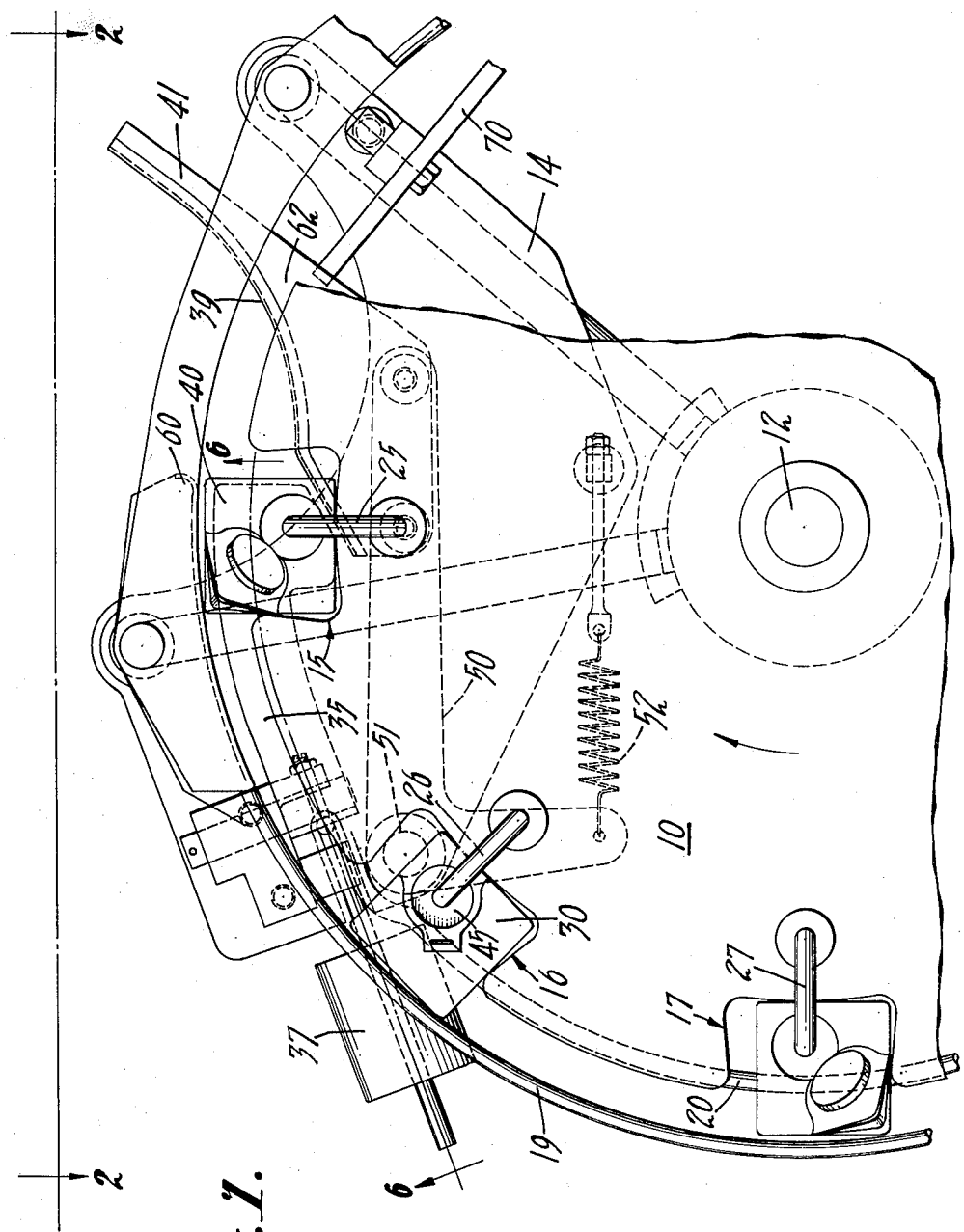

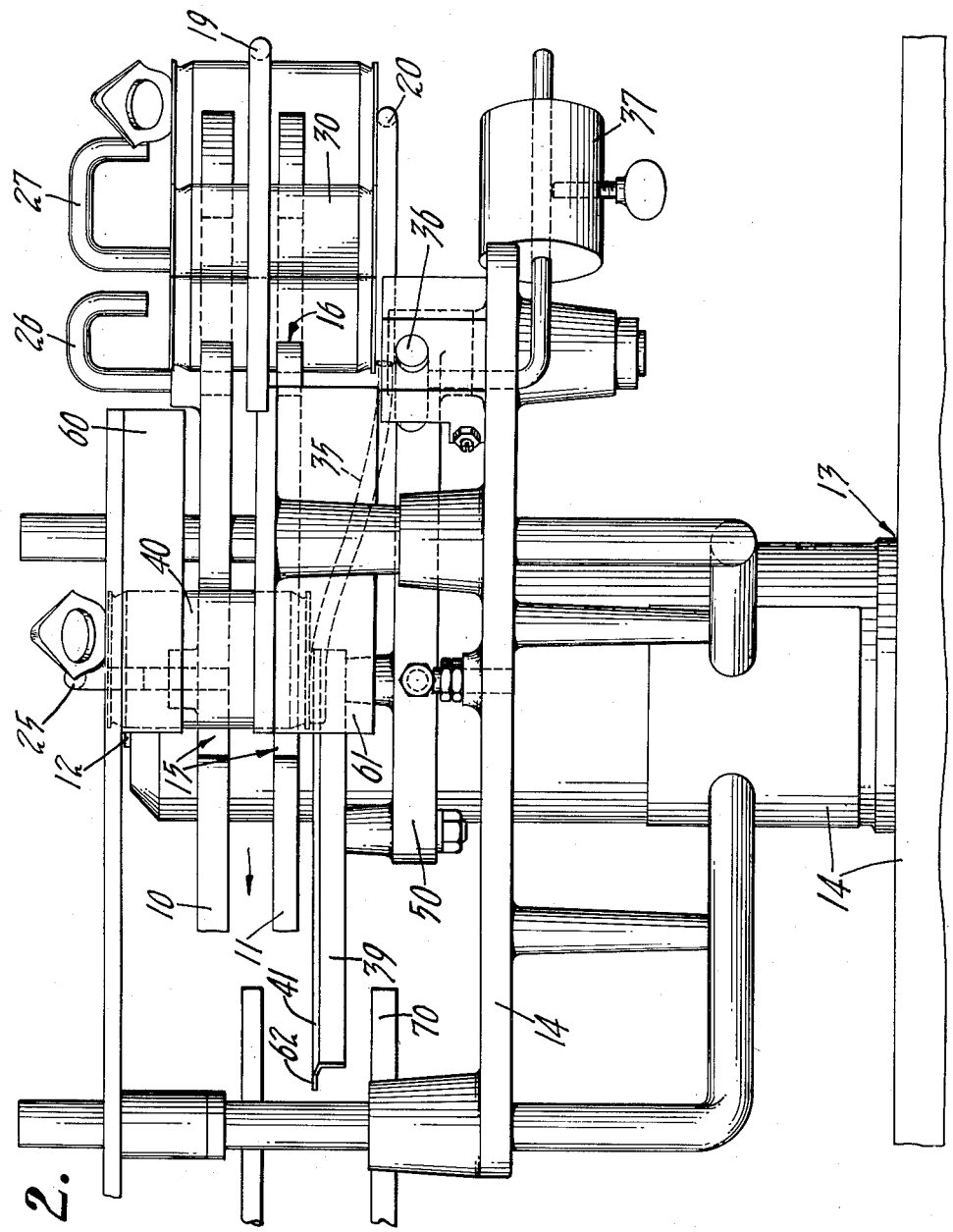

Jan. 30, 1962  J. M. MATEJEK  3,018,886
TESTING MECHANISM
Filed Dec. 24, 1959  5 Sheets-Sheet 3
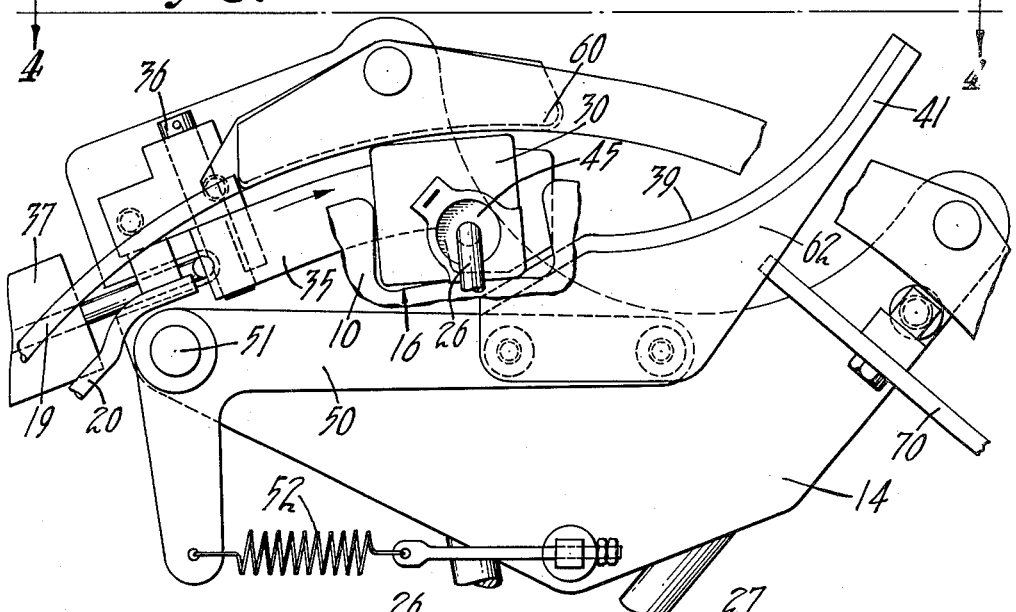
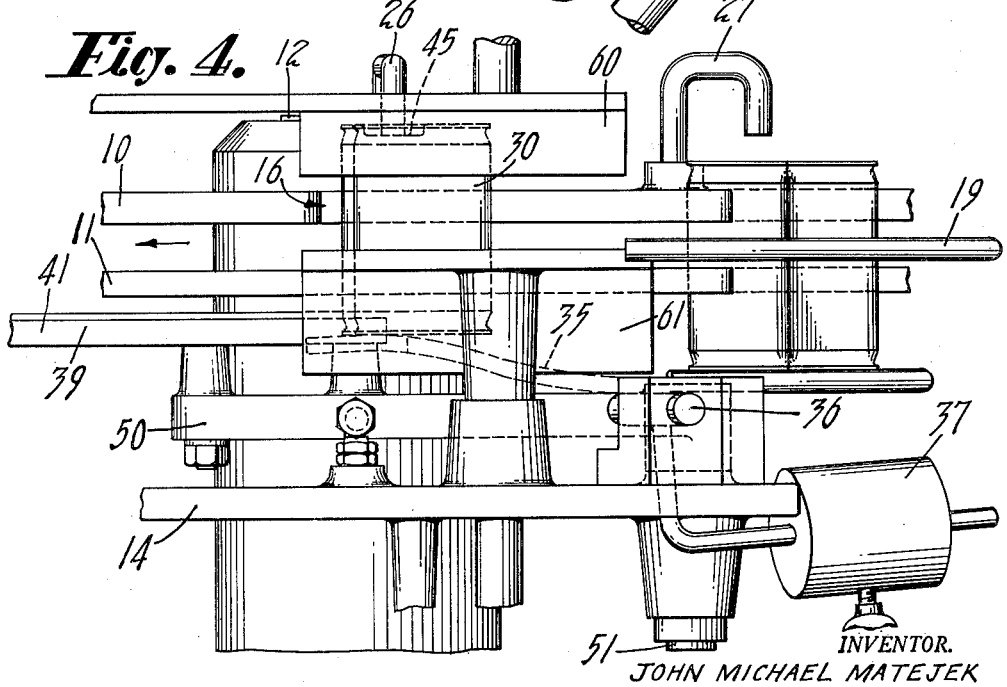
INVENTOR.
JOHN MICHAEL MATEJEK
BY James W. Fitzsimmons
George W. Reiter
ATTORNEYS Jan. 30, 1962 J. M. MATEJEK 3,018,886
TESTING MECHANISM
Filed Dec. 24, 1959 5 Sheets-Sheet 4

INVENTOR.
JOHN MACHAEL MATEJEK
BY James W. Fitzsimmons
George W. Reiber
ATTORNEYS

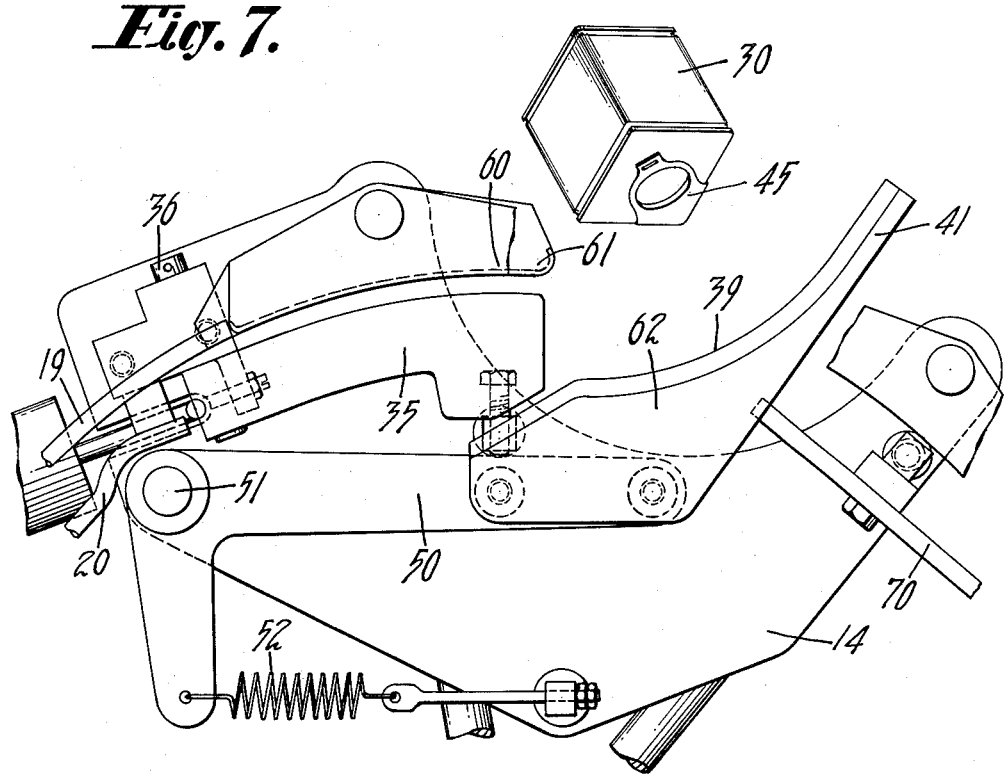

United States Patent Office 3,018,886
Patented Jan. 30, 1962

3,018,886
TESTING MECHANISM
John Michael Matejek, Plainfield, N.J., assignor to American Can Company, New York, N.Y., a corporation of New Jersey
Filed Dec. 24, 1959, Ser. No. 861,874
8 Claims. (Cl. 209—72)

The present invention relates to container treatment machinery and more particularly to an improved mechanism for detecting and ejecting abnormally oriented or abnormally closed containers having attached closure elements as an incident to preparing the containers for a subsequent operation such as interior coating, filling, sterilizing or the like.

Cardboard containers for milk or the like having attached closure elements must be conveyed to various treatment stations with their attached closure elements in the open position and properly oriented on the conveyor apparatus or it will be apparent that the various container interior treatments cannot be performed. Patent Number 2,711,821 to Hunter et al., issued June 28, 1955, and assigned to the assignee of the present application discloses one form of detector mechanism that is intermittently operated to detect and eject abnormally closed or improperly oriented containers.

It is a principal object of the present invention to provide an improved mechanism for detecting and ejecting abnormally oriented or abnormally closed containers that is simple and reliable and has a minimum of moving parts.

Another object of the present invention is to provide an improved testing device of the character described that is continuously operating to test containers moving at relatively high conveyor speeds.

A feature of the invention is the provision of a continuously rotating turret having a plurality of spaced apart container receiving pockets about its periphery. This turret is positioned at the end of a feed-in conveyor for receiving respective cartons in respective ones of the pockets as the turret is rotated and the containers are conveyed to it. Carried by the turret in a position to extend downward from above the containers towards the turret pockets are a plurality of detector fingers or pronges, one for each pocket. When in the turret pockets, the containers are supported on a conveyor rail, the upper surface of which is disposed at the normal feed level of the mechanism. When the containers are supported at the normal feed level, the end of each finger is above the respective container and positioned over the filling opening when the container is properly oriented. At one point in the rotation of the turret, the containers pass over an upwardly inclined yieldable trap rail which tends to raise the carton above the normal feed level so that the detector finger penetrates the filling opening. If the closure is improperly closed or the container is not properly oriented, the end of the detector finger will physically contact the closed lid or the top of the container to depress the yieldable trap rail and prevent the container from rising. Those containers that do not rise are brought into contact with a spring loaded ejector arm which, as the container is moved past a predetermined point, is cocked and triggered by the passage of the container to eject and throw the container outwardly from the turret pocket and into a reject receptacle. Those containers which are properly oriented and have their closure elements open continue to move with the turret over and above the spring loaded ejector mechanism whereupon they are dropped back onto the conveyor rail at the normal feed level to disengage the detector finger from the container opening. Thereafter, before the turret completes a single revolution, the satisfactorily tested containers are removed from the turret pockets and passed onto an output conveyor.

Further objects, features and the attendant advantages of the invention will be apparent with reference to the following specification and drawings in which;

FIG. 1 is a fragmentary plan view of the testing mechanism, showing an undetected normally opened and oriented container in position in the detecting station.

FIG. 2 is a side elevation of FIG. 1, taken substantially along the line 2—2 in FIG. 1, FIG. 3 is a fragmentary plan view similar to FIG. 1, but showing a detected abnormally closed container in position in the detecting station, FIG. 4 is a side elevation of FIG. 3, taken substantially along the line 4—4 in FIG. 3, FIG. 5 is a view similar to FIG. 3 showing the ejector mechanism being cocked just before being triggered by the passage of the detected abnormally closed container.

Figure 6:
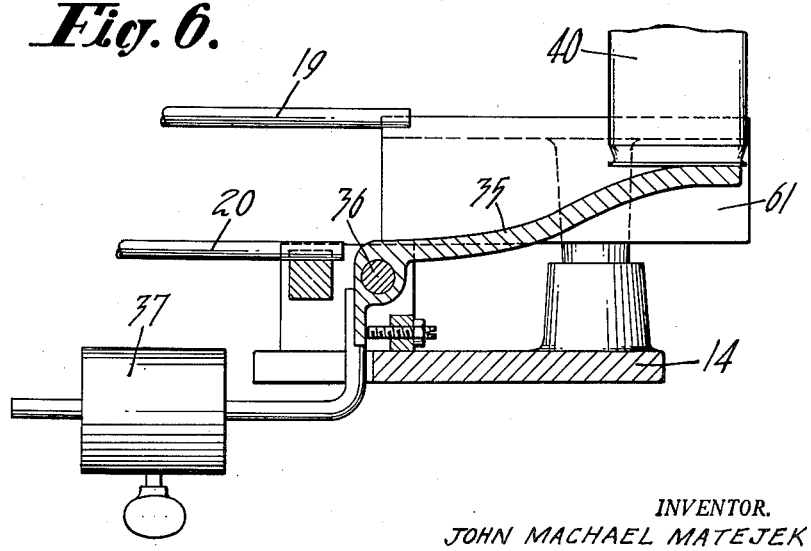

FIG. 6 is a fragmentary sectional view taken substantially along the line 6—6 in FIG. 1 showing an undetected container as it rises on the yieldable trap rail to pass over the ejecting mechanism, FIG. 7 is a view similar to FIGS. 3 and 5 but showing the detected container being ejected.

Referring to the drawings, it should first be understood that milk cartons or other containers to be tested as described are conveyed to and from the testing turret by suitable conveyor mechanisms of any known form (not shown). The containers shown being tested in the instant drawings are of the type disclosed in United States Patent 2,085,979, issued to John M. Hothersall, and comprise an all-fibre body having secured to its top end a hinge plug closure adapted to seal an off-center filling and dispensing opening cut in the container end. The rotatable testing turret may be comprised of disk members 10 and 11 secured for rotation with a shaft 12 journalled at 13 on the machine frame 14. Each turret disk 10, 11 is provided with spaced apart peripheral pockets such as shown variously at 15, 16, and 17. Circular rails are shown at 19, 20 to respectively guide and support each carton received in a turret disk pocket as the carton is moved upon continuous rotation of the turret disks 10, 11, the support rail 20 being disposed beneath the path of travel of the cartons with its upper surface in the plane of the normal feed level of the mechanism. It should be understood that shaft 12 is rotated by any suitable power source (not shown).

Supported on the turret disk 10 are a plurality of detector fingers such as shown at 25, 26 and 27. It will be understood that there is a respective detector pin positioned over each turret pocket and their position is such that when a container is properly oriented with its filling opening open, the detector finger will project downwardly towards the open filling opening of the respective carton.

As shown in FIGS. 2 and 4 of the drawings, the turret is rotated to move the cartons from right to left and for example, in FIG. 2 of the drawings, a carton 30 is about to be moved off of the supporting rail 20 onto an upwardly inclined yieldable trap rail 35. The trap rail 35 is pivoted at 36 and normally held in the position shown at FIG. 2 by an adjustable weight 37.

As shown by FIG. 4 of the drawings, the carton 30, whose filling opening is improperly closed by a hinged closure plug 45 causes the trap rail 35 to be depressed when the detector finger 26 contacts the closed closure plug 45 to prevent the carton 30 from rising normally. In this position, the side of the detected carton 30 engages the curved side wall 39 of an ejector arm 41 which as more clearly shown in FIGS. 3 and 5 of the drawings, is secured to a spring loaded arm 50 pivoted at 51 and biased by a tension spring 52.

The ejector arm 41 is so shaped that as the depressed carton 30 moves with the rotation of the turret, one side of the carton 30 is forced into contact with short outer guide plates 60, 61 (see FIG. 4) which in effect comprise extensions of the guide rail 19, and the ejector arm 41 is pivoted or cocked clockwise against the tension of the spring 52. After the carton 30 passes a predetermined point coinciding with the end of the guide plates 60, 61 as shown by FIG. 7 of the drawings, the ejector arm 41 is triggered to return by spring action to its normal position and eject the detected carton 30.

The properly oriented and opened cartons such as the carton 40 which pass the predetermined point undetected to rise up over the ejector arm 41, thereafter ride along the top surface 62 of the ejector arm 41 and are caused to drop back down onto a lower support rail 70, the upper surface of which is disposed at the normal feed level of the mechanism, from which rail 70 such cartons may be subsequently removed and transferred to other machines or conveyors (not shown) for subsequent operations.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for testing containers to pass only normal containers each having an unobstructed filling opening properly positioned in its upper end, the combination of a feeding device for advancing normal and abnormal containers along a predetermined path of travel, a depending detector pin positioned to move along and above each container for a predetermined distance along the path of travel, said feeding device having yieldable means to raise each container as it passes a predetermined point along the predetermined distance with the detector pin entering the filling opening of a normal container, said yieldable means being movable downward upon physical contact between an abnormal container and the associated detector pin to prevent the abnormal container from rising as it passes the predetermined point with the closure element closed, and a spring loaded ejector element positioned to be cocked and triggered only by an unraised container passing the predetermined point and operable when triggered to eject the unraised container from the path of travel.

2. In a machine for testing containers to pass only normal containers each having an unobstructed filling opening properly positioned in its upper end, the combination of a rotary turret having a plurality of container receiving apertures spaced apart around its periphery to receive and advance normal and abnormal containers along a predetermined path of travel, a plurality of depending detector pins carried by said turret with a respective one of the pins positioned above a respective one of said turret apertures, each of said pins being positioned at a height above the tops of the containers in their normal height of path of travel while received in a respective aperture, yieldable means to raise each container above the normal path of travel as it passes a predetermined point in the rotation of said turret with the associated detector pin entering the filling opening of a normal container, said yieldable means being movable downward upon physical contact between an abnormal container and the associated detector pin to prevent the abnormal container from rising as it passes the predetermined point, a spring loaded ejector element adjacent said turret near the predetermined point to be cocked and triggered only by an unraised container passing the predetermined point and operable when triggered to eject the unraised container outwardly from the turret aperture, and means positioned beyond the predetermined point along the direction of rotation of said turret to drop a raised container back to the normal height of path of travel with the detector pin withdrawn from the filling aperture.

3. In a machine for testing containers to pass only normal containers each having an unobstructed filling opening properly positioned in its upper end, the combination of a rotary turret having a plurality of container receiving apertures spaced apart around its periphery to receive and advance normal and abnormal containers along a predetermined path of travel, means to support the containers at a predetermined height during their path of movement upon rotation of the turret, a plurality of depending detector pins carried by said turret with a respective one of the pins positioned above a respective one of said turret apertures, each of said pins being positioned at a height above the tops of the containers in their predetermined height of path of travel while received in a respective aperture, said means to support the containers having yieldable means to raise each container above the predetermined height of path of travel as it passes a predetermined point in the rotation of said turret with the associated detector pin entering the filling opening of a normal container, said yieldable means being movable downward upon physical contact between an abnormal container and the associated detector pin to prevent the abnormal container from rising as it passes the predetermined point with the closure element closed, a spring loaded ejector element positioned beneath said turret near the predetermined point to be cocked and triggered only by an unraised container passing the predetermined point and operable when triggered to eject the unraised container outwardly from the turret aperture, and means positioned beyond the predetermined point along the direction of rotation of said turret to drop a raised container back to the predetermined height of travel on said means to support the containers with the detector pin withdrawn from the filling aperture.

4. The machine of claim 3 wherein said yieldable means comprises a counterbalanced, upwardly inclined rail pivotally mounted for movement in a vertical direction.

5. The machine of claim 4 wherein said spring loaded ejector element comprises an arm pivotally mounted for movement in a horizontal direction.

6. The machine of claim 5 wherein said ejector element is provided with a side wall which contacts said unraised containers to move said ejector element inwardly to cock the same preparatory to the ejectment of said container, and wherein retaining means are provided to hold said containers in the turret apertures while said ejector element is being cocked.

7. The machine of claim 6 wherein said retaining means terminate at said predetermined point to trigger said ejector element and permit it to move outwardly to eject abnormal containers from the turret apertures.

8. In a machine for testing containers to pass only normal containers each having a closure properly positioned thereon, the combination of a feeding device for advancing normal and abnormal containers along a predetermined path of travel, a detector element mounted and actuated to move with said containers along a portion of said path of travel with said element directed toward a said closure on an advancing container, yieldable guide means mounted for reciprocation adjacent said portion of the path of travel and operable to shift each of said advancing containers a predetermined distance at substantially right angles to said path and toward said detector element, said detector element being so positioned relative to said feeding device to be engageable with an abnormally positioned closure on a container to stop the abnormal container and thus cause said guide means to yield and thereby prevent such abnormal containers from being shifted through said predetermined distance, and a spring loaded ejector means positioned in the path of each of said abnormal containers between said guide means and detector while the abnormal container is thus engaged by the detector element, whereby said ejector means is cocked and triggered by engagement with only abnormal containers to eject them from said feeding device.

References Cited in the file of this patent

UNITED STATES PATENTS 2,711,821    Huntar _____ June 28, 1955